United States Patent Office 3,117,155
Patented Jan. 7, 1964

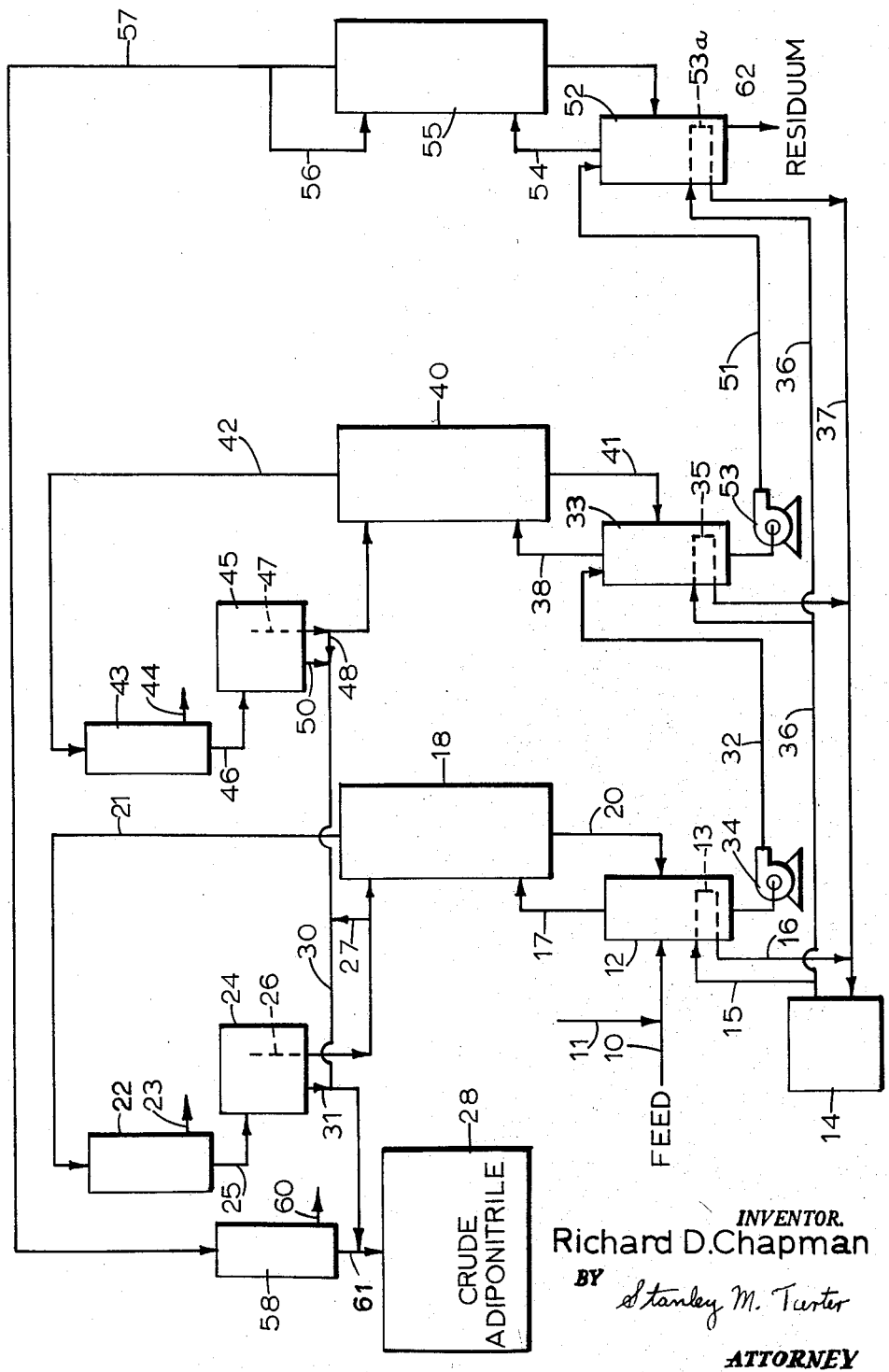

3,117,155
PRODUCTION OF ADIPONITRILE FROM A RESIDUE OF DELTA-CYANO-VALERAMIDE
Richard D. Chapman, Durham, N.C., assignor, by mesne assignments, to Monsanto Chemical Company, a corporation of Delaware
Filed Feb. 1, 1961, Ser. No. 86,386
4 Claims. (Cl. 260—465.2)

The present invention relates to a process for the reclamation of adiponitrile from a reaction residue. More particularly, the invention relates to a method of converting delta-cyanovaleramide contained in a reaction residue into adiponitrile and recovering the converted adiponitrile, said residue being originated from the reaction product obtained in the manufacture of adiponitrile wherein adipic acid and ammonia are heated in the presence of a dehydrating catalyst and the thus-formed adiponitrile is separated therefrom.

The production of adiponitrile from adipic acid has assumed importance as a valuable intermediate from which hexamethylene diamine can be prepared, the said diamine and the adipic acid constituting the basic substances employed in the production of nylon-66. For obvious reasons the hexamethylene diamine is the more expensive component used in the preparation of nylon-66. Hence, it is quite desirable to reduce the cost of the nitrile as much as possible as a precursor to the manufacture of hexamethylene diamine.

Adiponitrile is produced commercially today by the reaction of adipic acid with ammonia in a well-known process which employs certain dehydration catalysts. The dehydration catalysts which may be employed for the conversion of ammonia and adipic acid mixtures to adiponitrile include, for example, the dehydrating oxides of aluminum, silicon, tungsten, titanium, molybdenum, and the like. A catalyst yielding excellent results is a sintered mixture of boric and phosphoric acids. Unfortunately, a major problem encountered in the manufacture of adiponitrile is that, when adipic acid and ammonia are reacted together, side reactions occur, resulting in the formation of various impurities. The impurities include such substances as delta-cyanovaleric acid, delta-cyanovaleramide, 1-cyanocyclopentylidineimine, adipamide, tars, elemental carbon and other compounds. Before the adiponitrile is hydrogenated to produce hexamethylene diamine, the adiponitrile is separated from the reaction product of the ammonia and adipic acid, thereby leaving an organic residue containing the aforesaid impurities. In a process for the production of adiponitrile as presently carried out commercially, the reaction product is subjected to fractional distillation, the adiponitrile in which is recovered as an overhead product. The residue from this distillation, it has been found, contains a considerable amount of delta-cyanovaleramide. Heretofore, economics of the process and other considerations have dictated that the residue containing the impurities be disposed of as waste, such as by burning. The present invention is to provide the art with a desideratum hitherto unsupplied; namely, a process whereby the impurities are treated in such a way that additional quantities of adiponitrile are converted from the impurities and the thus-converted adiponitrile is recovered economically.

Therefore, an object of the present invention is to provide a method of reclaiming adiponitrile from impurities in the reaction product of ammonia and adipic acid.

Another object of the present invention is to provide a continuous method of converting delta-cyanovaleramide in certain reaction residues into adiponitrile and recovering the thus-converted adiponitrile.

These and other objects of the invention will become more readily apparent from the following detailed description.

In the method of this invention, the foregoing objects are realized broadly by subjecting the residue, obtained in the manufacture of adiponitrile wherein adipic acid and ammonia are heated in the presence of a dehydrating catalyst and the thus-formed adiponitrile is separated therefrom leaving the residue rich in delta-cyanovaleramide, to an elevated temperature and under reduced pressure. The aforesaid amide is converted into adiponitrile, and the resulting adiponitrile is recovered. More specifically, the residue containing delta-cyanovaleramide is heated in a zone under reduced pressure and in the presence of a suitable dehydrating catalyst to convert the said amide into adiponitrile; and the heated residue is fractionally distilled, whereby the resulting water of reaction and some converted adiponitrile is taken overhead. It is quite important that the water of reaction be removed from the system forthwith after its formation as indicated hereinbelow. Some of the adiponitrile in the overhead product is decanted therefrom and is returned to the said zone so as to facilitate the removal of the water of reaction. Thereafter, the bottoms product of the fractional distillation is heated under reduced pressure to distill the adiponitrile therein fractionally.

With reference now in greater detail to the preferred practice of the invention, the residue obtained in the manufacture of adiponitrile, wherein adipic acid and ammonia are heated in the presence of a dehydrating catalyst and the thus-formed adiponitrile is separated therefrom, is continuously fed, together with a catalytic amount of a particular type of catalyst, to a first converting zone. In the first zone the residue is heated at a temperature about 200–300° C. and under a pressure of about 150–200 mm. of Hg to convert the delta-cyanovaleramide in the residue into adiponitrile. The resulting water of reaction and some converted adiponitrile are collected as an overhead product. The collected adiponitrile is decanted, and a portion of the decanted nitrile is returned continuously to the first zone. The bottoms product of the fractional distillation in the first zone is flowed into a second converting zone, wherein the product is heated at a temperature about 200–300° C. and under a pressure about 150–200 mm. of Hg to convert an additional amount of delta-cyanovaleramide into adiponitrile. The water of reaction in this second zone and some of the additionally converted adiponitrile are collected as an overhead product. The adiponitrile collected overhead in the second zone is decanted, and a portion of the decanted nitrile is returned continuously to the second zone. The bottoms product of the second fractional distillation is flowed into a stripping zone, wherein it is heated under very low pressure to distill the adiponitrile. The adiponitrile is collected and may be combined with adiponitrile recovered overhead in the two converting zones. The combined product may be subjected to additional operations to purify and to concentrate the converted and recovered adiponitrile. The bottoms product from the stripping zone is continuously removed as residuum. In the stripping zone the pressure is preferably less than 50 mm. of Hg, and the temperature preferably is maintained about 200–300° C.

The catalyst accompanying the residue to the converting zone may be such compounds as $H_3PO_4$, $(NH_4)H_2PO_4$ $(NH_4)_2HPO_4$, $(NH_4)_3PO_4$, $HPO_3$ or the like. The amount of catalyst may vary within reasonably wide limits. The employment of about 0.05–5.0% of catalyst in the residue, by weight, gives excellent results. The preferred amount of catalyst is in the range of 0.75–2.0%.

The time of treatment will depend on many process factors such as temperature, pressure, the particular catalyst employed, the character of the residue itself, and other process considerations. Of course, these factors should be correlated so that the process is the most efficient consistent with the economics thereof.

In order to obtain a more complete understanding of the present invention, reference is made now to the accompanying drawing which is a diagrammatic representation of a process system suitable for the conversion of delta-cyanovaleramide into adiponitrile and suitable for the recovery of the thus-converted adiponitrile. A residue feed line 10 is provided to supply feed material continuously to the system at a predetermined rate. For bringing about entry of a catalyst to the system a catalyst feed duct 11 is provided, this duct 11 communicating with line 10 so that the catalyst is effused into the feed material prior to discharge thereof into a first reaction vessel 12, wherein some of the feed material is vaporized. This vessel is provided with means to adjust the temperature of the feed material normally therein. To this end the vessel can contain an internal coil 13 in which a heating fluid moves in heat exchange relation with the feed material. For supplying heating fluid to said coil a heating fluid source such as boiler 14 is provided to accommodate delivery of such fluid to coil 13 via supply conduit 15. A return line 16 can be employed to provide re-entrance of the heating fluid to boiler 14. Line 17 establishes communication between a first fractional distillation column 18 and the top of vessel 12, the vaporized feed material being passed through line 17 to the lower part of the column. Column 18 is adapted to remove the water of reaction by overhead removal thereof with some adiponitrile being distilled therewith. This column is equipped with recycle line 20 to provide for the continuous refluence of the tails of the column to vessel 12.

Overhead line 21 defines a confined passageway between the top of column 18 and a condenser 22 adapted to condense the overhead product normally comprising steam and some of the adiponitrile converted from delta-cyanovaleramide present in the feed material. As indicated above, the conversion of the amide to adiponitrile is best accomplished under vacuum. For this purpose condenser 22 is equipped with a vacuum line 23 leading to vacuum producing equipment, not shown. For conducting the condensate to a decanting tank 24, a pipe 25 is fitted between the condenser 22 and the tank 24. In tank 24 the condensate is held up so that adiponitrile separates from the water of reaction due to the immiscibility of these substances. The upper layer of the two liquid layers in the tank contains the adiponitrile. Extending up into the tank 24 is an overflow tubular spillway 26 adapted to accommodate the return of adiponitrile to column 18. The recycled adiponitrile facilitates the removal of water in column 18, which result is desired. The amount of adiponitrile recycled is regulated; and, thus, it may not be necessary to recycle all the adiponitrile flowing through spillway 26. In which event, the overflowing stream of adiponitrile may be bifurcated with part of the adiponitrile being diverted through line 27 and eventually to a crude adiponitrile collection tank 28 via line 30. The lower layer in decanting tank 24 flows to collection tank 28 through conduit 31 and thence through line 30.

Outlet line 32 establishes communication between the bottom of first reaction vessel 12 and a second reaction vessel 33. In the line between the said vessels is positioned a pumping means such as pump 34 to propel the bottoms product of the first vessel to the second vessel. This second reaction vessel is also equipped with means to adjust the temperature of the material supplied to it from the first vessel. To this end the vessel can contain an internal coil 35 in which a heating fluid moves in heat exchange relation. For supplying heating fluid to this coil, supply line 36 interconnects the coil with boiler 14. A return line 37 can be employed to provide re-entrance of the heating fluid to boiler 14. Line 38 establishes communication between a second fractional distillation column 40 adapted to separate the water of reaction by overhead removal thereof with some adiponitrile being distilled therewith. Column 40 is equipped with a recycle line 41 to provide for the continuous refluence of the tails of the column to vessel 33.

Overhead line 42 defines a confined passageway between the top of column 40 and a condenser 43 adapted to condense the overhead product normally comprising steam and some of the adiponitrile converted from delta-cyanovaleramide present in the feed material. The condenser 43 is equipped with a vacuum line 44 leading to vacuum producing equipment. For conducting the condensate to a decanting tank 45, pipe 46 is fitted between the condenser 43 and the tank 45. In tank 45 the condensate of the second fractional distillation is detained so that adiponitrile is allowed to separate from the water of reaction. The upper layer of the two layers in the tank contains the adiponitrile. Extending up into the tank 45 is an overflow spillway 47 to accommodate the return of adiponitrile to column 40. The recycled adiponitrile facilitates the removal of water, which result is desired. The amount of adiponitrile recycled is regulated; and, thus, it may not be necessary to recycle all the adiponitrile flowing through spillway 47. In which event, the overflowing stream of adiponitrile may be bifurcated with part of the adiponitrile flowing through line 48 and eventually to collecting tank 28 via line 30. The lower layer in decanting tank 45 flows through line 50 and thence through line 30 to tank 28.

Outlet line 51 establishes communication between the bottom of second reaction vessel 33 and a vessel 52. Positioned in the line between vessel 33 and vessel 52 is a pump 53 adapted to propel the bottoms product of vessel 33 to vessel 52. Vessel 52 is provided with means to adjust the temperature of the material supplied to it from vessel 33. To this end the vessel can contain an internal coil 53a in which a heating fluid moves in heat exchange relation. For circulating heating fluid through the coil, supply line 36 and return line 37 interconnect the coil with the boiler 14. Line 54 establishes communication between vessel 52 and a distillation column 55 adapted to strip the adiponitrile by overhead removal thereof. Column 55 may be equipped with a recycle line 56 to provide some fractionation of the adiponitrile, if desired.

Overhead line 57 establishes communication between the top of column 55 and a condenser 58 for condensing the overhead product. The condenser is equipped with a vacuum line 60. For conducting the condensate of condenser 58 to collecting tank 28, pipe 61 is fitted between condenser 58 and line 30. The residuum of vessel 52 flows from the system via conduit 62 for suitable disposition thereof.

The adiponitrile recovered and collected in tank 28 may be concentrated and purified. The recovered adiponitrile can be hydrogenated advantageously to produce valuable hexamethylene diamine.

In order better to illustrate the invention, the following examples which are given to exemplify the invention but which should not be construed to limit the same are provided. The parts and percentages used hereinbelow are by weight unless otherwise indicated.

*Example I*

Residue, obtained in the manufacture of adiponitrile wherein adipic acid and ammonia are heated in the presence of a dehydrating catalyst and the thus-formed adiponitrile is separated therefrom, was treated in a continuous manner, using the equipment described above and illustrated in the annexed drawing. Continuous processing was carried out employing two serially connected reaction vessels, each of which was equipped with a column packed with Berl saddles. A condenser was arranged with each column to condense the water and adiponitrile distilled overhead. The condensates were decanted with the recovered nitrile being returned to the respective columns. The bottoms product of the second reactor was fed continuously to a stripping vessel where the adiponitrile formed during the prior stages was distilled from the product at 210° C. and at a pressure of 10 mm. of Hg. The residuum of this distillation was continuously withdrawn from the stripping vessel.

At the startup, a suitable quantity of the residue was siphoned into the first vessel and a portion thereof was transferred in a similar manner to the second vessel. The pressure in the two vessels are controlled at 150–200 mm. of Hg to maintain a boiling temperature of about 250° C.

In one run the residue containing approximately 56% delta-cyanovaleramide and 2% added $(NH_4)_2HPO_4$ catalyst was preheated to 100° C. On a cumulative basis 5000 mls. of the preheated residue was fed continuously to the treating apparatus over a period of time of 12½ hours. The throughput time of the material processed in the apparatus averaged 2.4 hours. The pressure in the first and second vessels was maintained at 138 mm. of Hg, and the base temperatures in the vessels were maintained at 259° C. and 250° C., respectively. A total of approximately 1500 grams of adiponitrile was converted from the delta-cyanovaleramide and recovered from the residue.

*Example II*

In a second run 17,000 mls. of the same residue as in Example I was fed in a continuous fashion through the apparatus over a period of time of 23 hours, the average hold-up time of the material therein being 4.4 hours. The pressure in the first and second vessels was maintained at 151 mm. of Hg absolute, and the base temperatures in the vessels were maintained at 249° C. and 250° C. respectively. A total of approximately 4700 grams of adiponitrile was converted from the delta-cyanovaleramide and recovered from the residue.

*Example III*

During the course of the continuous operation as described in the above examples, catalyst concentrations of 0.75% to 2.0% were employed. In each instance excellent conversions of the amide to nitrile were accomplished.

*Example IV*

In another run only one reaction vessel was employed. Residue of the type described in Example I and containing 2% $(NH_4)_2HPO_4$ as catalyst was fed at 100° C. to the treating apparatus over a period of time of 20 hours for a cumulative feed delivery of 9400 mls. The throughput time of the material averaged 3.5 hours. The pressure in the vessel was 90 mm. of Hg absolute, and the base temperature thereof was 250° C. The stripping column, as in the above examples, was maintained at 210° C. and at a pressure of 10 mm. of Hg. A total of approximately 1790 grams of adiponitrile was converted from the delta-cyanovaleramide and recovered from the residue.

By the practice of the invention as above described numerous advantages have been found to result. Firstly, the valuable precursor of hexamethylene diamine, namely, cyanovaleramide, that would normally be lost from the system, is converted to adiponitrile which in turn is recovered advantageously by the disclosed process. Secondly, a waste disposal problem of the cyanovaleramide from which adiponitrile is converted and recovered is obviated.

Various modifications of the invention will be apparent to those skilled in the art. Hence, it will be understood that the invention is not limited to the foregoing description and the annexed drawing except as it is defined in the appended claims.

What is claimed is:

1. In the manufacture of adiponitrile wherein adipic acid and ammonia are heated in the presence of a dehydrating catalyst and the thus-formed adiponitrile is separated from the reaction product leaving a residue containing delta-cyanovaleramide, the method of converting the said amide into adiponitrile and recovering the converted adiponitrile which comprises the steps of: continuously feeding said residue, together with a catalytic amount of a dehydrating catalyst selected from the group consisting of $H_3PO_4$, $HPO_3$, $(NH_4)H_2PO_4$, $(NH_4)_2HPO_4$, and $(NH_4)_3PO_4$, to a first zone; in said first zone heating the said residue at a temperature about 200–300° C. under a pressure about 150–200 mm. of Hg to convert the said amide into adiponitrile and continuously fractionally distilling the water of reaction and some converted adiponitrile; continuously decanting a portion of the converted adiponitrile in the overhead product of the fractional distillation and continuously returning the decanted portion of adiponitrile to said first zone; continuously flowing the bottoms product of said first zone to a second zone; in said second zone heating the bottoms product of said first zone at a temperature about 200–300° C. and under a pressure about 150–200 mm. of Hg to convert an additional amount of said amide into adiponitrile and fractionally distilling the additional water of reaction and some of the additionally converted adiponitrile; continuously decanting a portion of the converted adiponitrile in the overhead product of the second fractional distillation and returning the decanted portion of adiponitrile to said second zone; continuously flowing the bottoms product of the second fractional distillation to a third zone; in the third zone heating said bottoms product of the second fractional distillation under reduced pressure to distill the adiponitrile therein fractionally; and continuously removing the bottoms product from the said third zone.

2. The method of claim 1 in which the pressure in the third zone is less than 50 mm. of Hg.

3. The method of claim 2 in which the temperature in the third zone is maintained about 200–300° C.

4. The method of claim 3 wherein the catalyst in the residue fed to the first zone is $(NH_4)_2HPO_4$.

References Cited in the file of this patent

UNITED STATES PATENTS

| | | |
|---|---|---|
| 2,144,340 | Lazier | Jan. 17, 1939 |
| 2,732,397 | Hull | Jan. 24, 1956 |